(12) United States Patent
Handwerker et al.

(10) Patent No.: US 10,112,231 B2
(45) Date of Patent: Oct. 30, 2018

(54) CAST PART WITH A METALLIC FUNCTIONAL REGION

(71) Applicant: SIEMENS AKTIENGESELLSCHAFT, München (DE)

(72) Inventors: Michael Handwerker, Bischofsheim (DE); Jean Pierre Bergmann, Erfurt (DE); René Schürer, Ilmenau (DE); Markus Johannes, Bad Neustadt (DE); Maximilian Sünnemann, Waltershausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/552,174

(22) PCT Filed: Jan. 7, 2016

(86) PCT No.: PCT/EP2016/050159
§ 371 (c)(1),
(2) Date: Aug. 18, 2017

(87) PCT Pub. No.: WO2016/131556
PCT Pub. Date: Aug. 25, 2016

(65) Prior Publication Data
US 2018/0043420 A1    Feb. 15, 2018

(30) Foreign Application Priority Data
Feb. 20, 2015   (EP) ..................................... 15155986

(51) Int. Cl.
*B23K 20/12*      (2006.01)
*B21J 5/06*       (2006.01)
(Continued)

(52) U.S. Cl.
CPC ............... *B21J 5/066* (2013.01); *B21J 5/063* (2013.01); *B21K 25/005* (2013.01);
(Continued)

(58) Field of Classification Search
CPC .................. B23K 20/122–20/128; B21J 5/066
(Continued)

(56) References Cited

U.S. PATENT DOCUMENTS

| 4,134,036 A | 1/1979 | Curtiss |
| 7,102,267 B2 | 9/2006 | Gromoll et al. |

(Continued)

FOREIGN PATENT DOCUMENTS

| CA | 2829738 C | * 11/2015 | ......... B23K 20/1265 |
| CN | 1338978 A | 3/2002 | |

(Continued)

OTHER PUBLICATIONS

PCT International Search Report dated Apr. 15, 2016 corresponding to PCT International Application No. PCT/EP2016/050159.
(Continued)

*Primary Examiner* — Kiley S Stoner
(74) *Attorney, Agent, or Firm* — Henry M. Feiereisen, LLC

(57) ABSTRACT

A cast part includes a metallic functional region. The functional region extends in a first direction from a first side to a second side of the cast part. The cast part has a surrounding region at least partially surrounding the functional region. The functional region is shaped by a friction-based process. Further disclosed is a piece of equipment, such as an electrical machine which includes a further component and a device for securing the further component against twisting. The device has a connection between the functional region of the cast part and the further component.

3 Claims, 7 Drawing Sheets

(51) Int. Cl.
*B21K 25/00* (2006.01)
*B23K 103/06* (2006.01)

(52) U.S. Cl.
CPC .......... *B23K 20/122* (2013.01); *B23K 20/127* (2013.01); *B23K 20/1275* (2013.01); *B23K 2103/06* (2018.08)

(58) Field of Classification Search
USPC ........................................................ 228/2.1
See application file for complete search history.

(56) References Cited

U.S. PATENT DOCUMENTS

| | | | |
|---|---|---|---|
| 7,517,257 | B2 | 4/2009 | Handwerker |
| 8,936,302 | B2* | 1/2015 | Miyahara ............... B62D 21/00 296/203.01 |
| 9,221,233 | B2* | 12/2015 | Sayama ............... B32B 15/012 |
| 2004/0155094 | A1 | 8/2004 | Aono et al. |
| 2005/0139640 | A1* | 6/2005 | Kay .................. B23K 20/1265 228/112.1 |
| 2006/0266797 | A1 | 11/2006 | Kainer et al. |
| 2006/0289604 | A1* | 12/2006 | Zettler ............... B23K 20/1255 228/2.1 |
| 2007/0057015 | A1* | 3/2007 | Colligan ............ B23K 20/1255 228/2.1 |
| 2007/0152015 | A1* | 7/2007 | Burton ............... B23K 20/1255 228/2.1 |
| 2008/0029581 | A1* | 2/2008 | Kumagai ........... B23K 20/1255 228/101 |
| 2010/0096438 | A1* | 4/2010 | Sato .................. B23K 20/1225 228/114 |
| 2014/0004375 | A1* | 1/2014 | Yamauchi .......... B23K 20/1225 428/615 |
| 2014/0246882 | A1* | 9/2014 | Miyahara ............... B62D 21/00 296/203.01 |
| 2014/0248510 | A1* | 9/2014 | Sayama ................ B32B 15/012 428/653 |
| 2016/0167161 | A1* | 6/2016 | Sato ................... B23K 20/1255 228/114.5 |
| 2016/0184921 | A1* | 6/2016 | Chiashi .............. B23K 20/1265 428/594 |
| 2016/0318239 | A1* | 11/2016 | Silvanus ............. B29C 66/1142 |
| 2017/0129161 | A1* | 5/2017 | Ueno .................. B29C 65/0681 |
| 2017/0157720 | A1* | 6/2017 | Sato .......................... B23P 6/04 |
| 2017/0182587 | A1* | 6/2017 | Tokoro .............. B23K 20/1265 |
| 2017/0312850 | A1* | 11/2017 | Werz .................. B23K 20/1255 |

FOREIGN PATENT DOCUMENTS

| | | | | | |
|---|---|---|---|---|---|
| DE | 102010026667 | A1 * | 3/2011 | | |
| EP | 1400302 | A1 * | 3/2004 | ......... | B11K 25/005 |
| JP | 10071478 | A * | 3/1998 | ......... | B23K 20/1255 |
| JP | 2003112271 | A * | 4/2003 | | |
| JP | 2010178589 | A * | 8/2010 | | |
| JP | 2010178598 | A * | 8/2010 | | |
| WO | WO-2005018865 | A1 * | 3/2005 | ............. | B23K 20/12 |

OTHER PUBLICATIONS

Austenit (Gefügebestandteil)- p. 1-2; and English translation http://de.wikipedia.org/wiki/Austenit_(Gef%C3%BCgebestandteil); im Internet gefunden am Jan. 19, 2015.
Chemical composition, Mechanical, physical and environmental properties of SKD6 . . . p. 1 von 1; http://www.steel-grades.com/Steel-grades/Tool-steel-Hard-alloy/skd61.html; gefunden im Internet am Jan. 28, 2015.
Tensile testing—Wikipedia, the free encyclopedia p. 1 von 4; http://en.wikipedia.org/wiki/Tensile_testing; gefunden im Internet am Jan. 19, 2015.

* cited by examiner

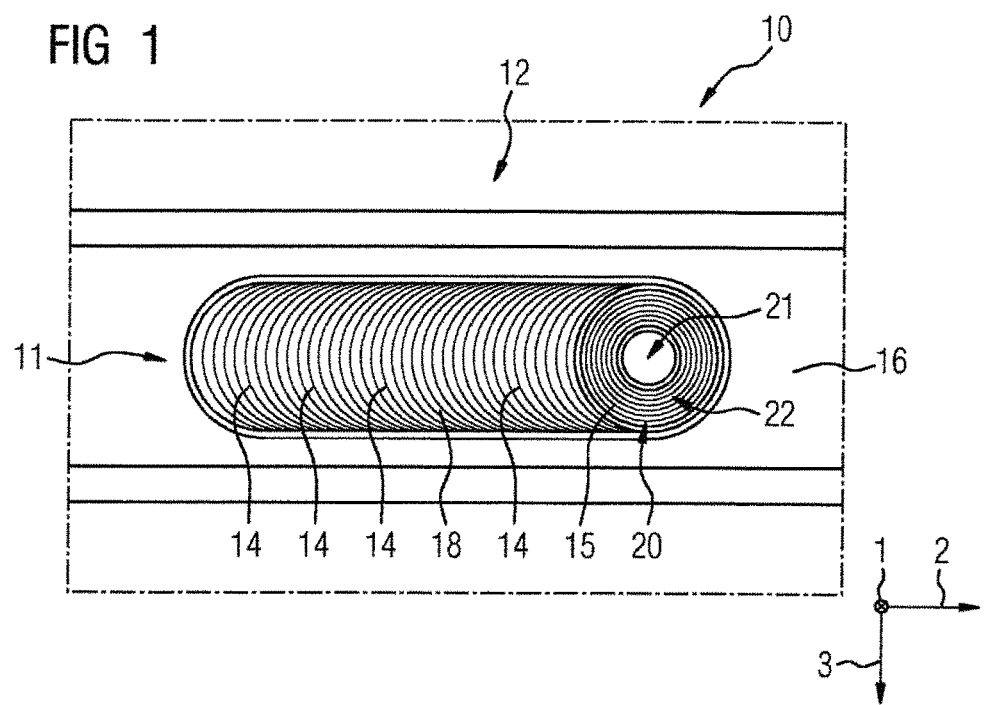
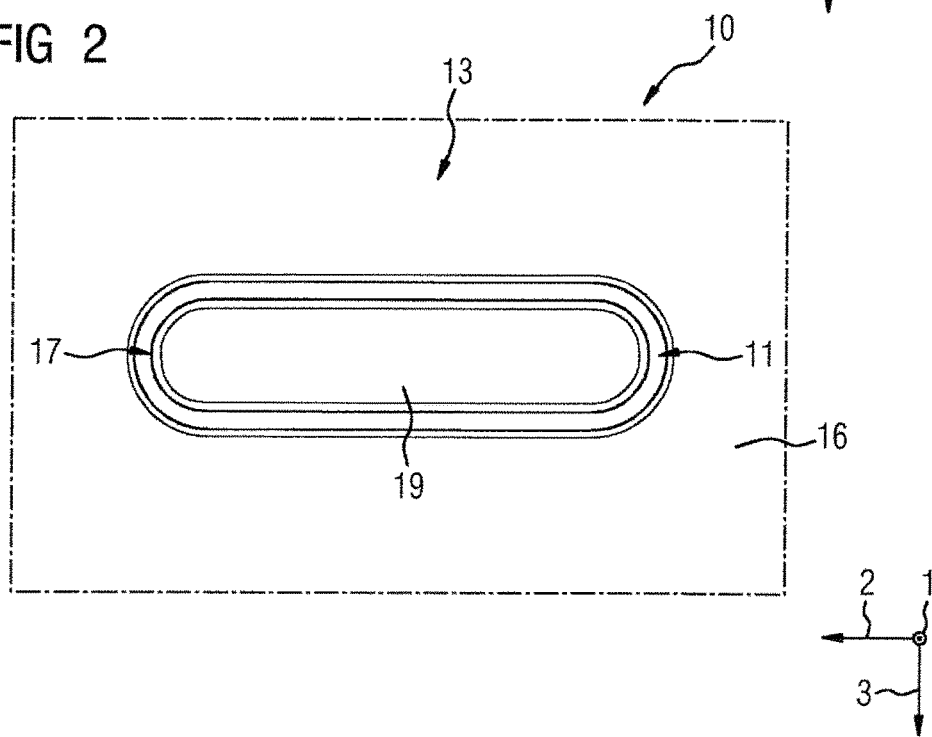

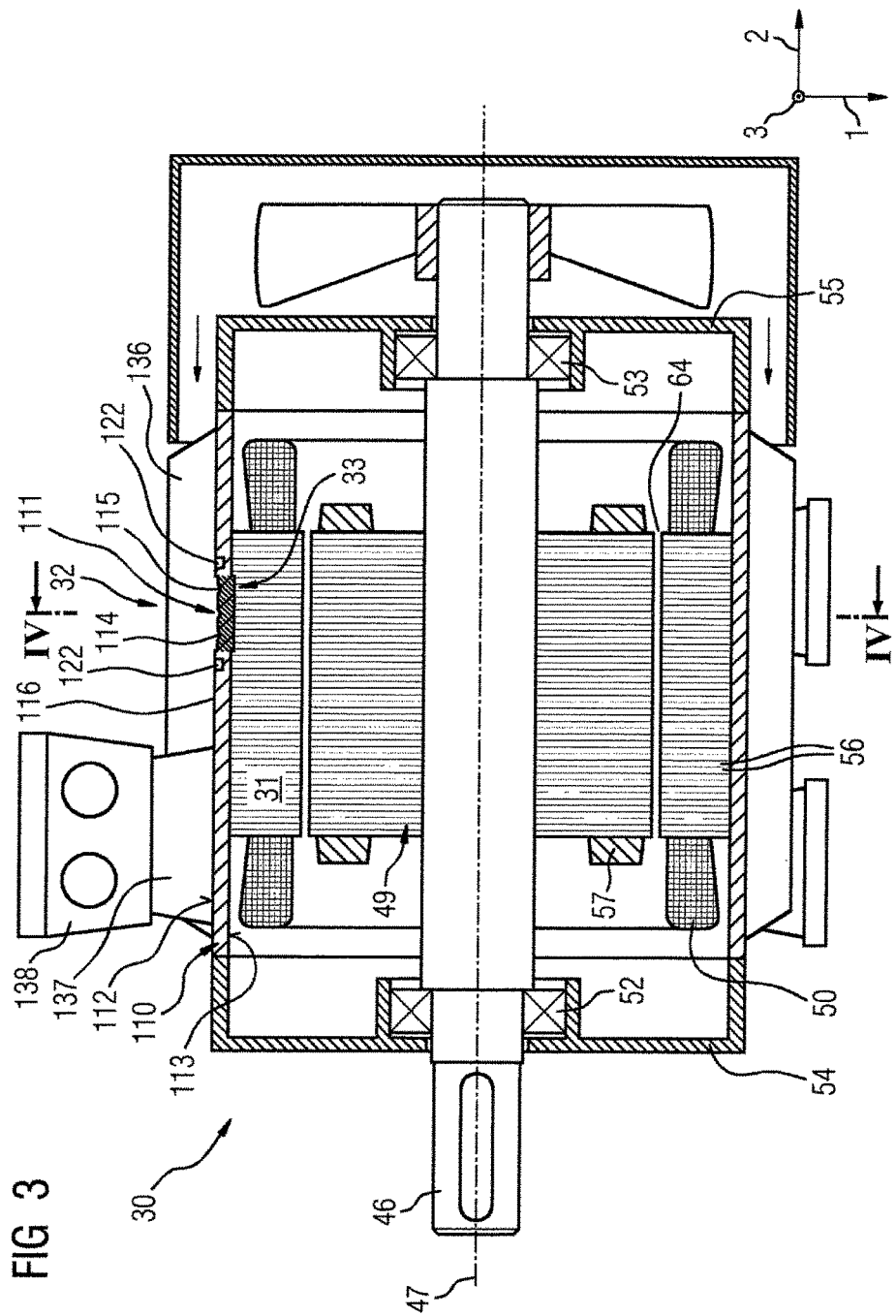

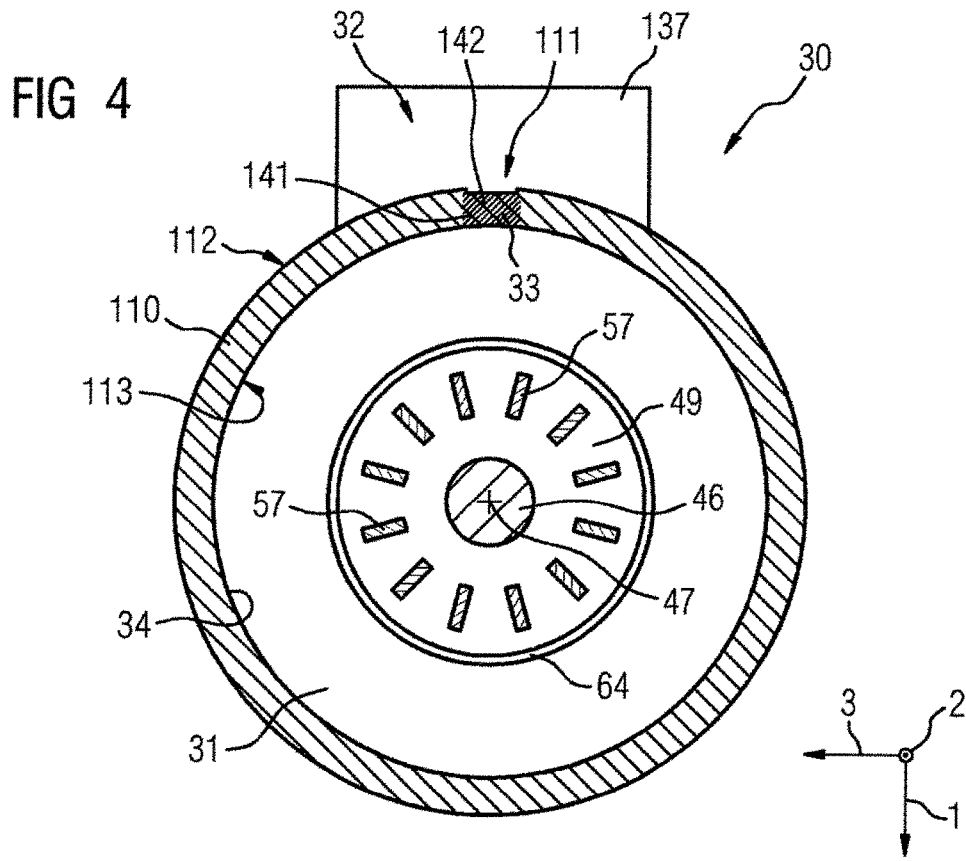
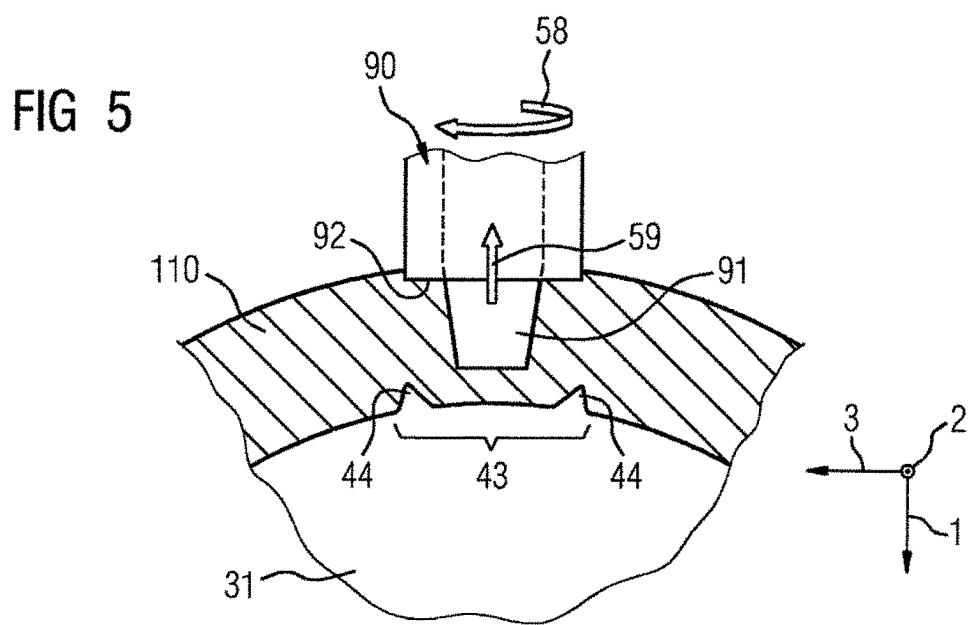

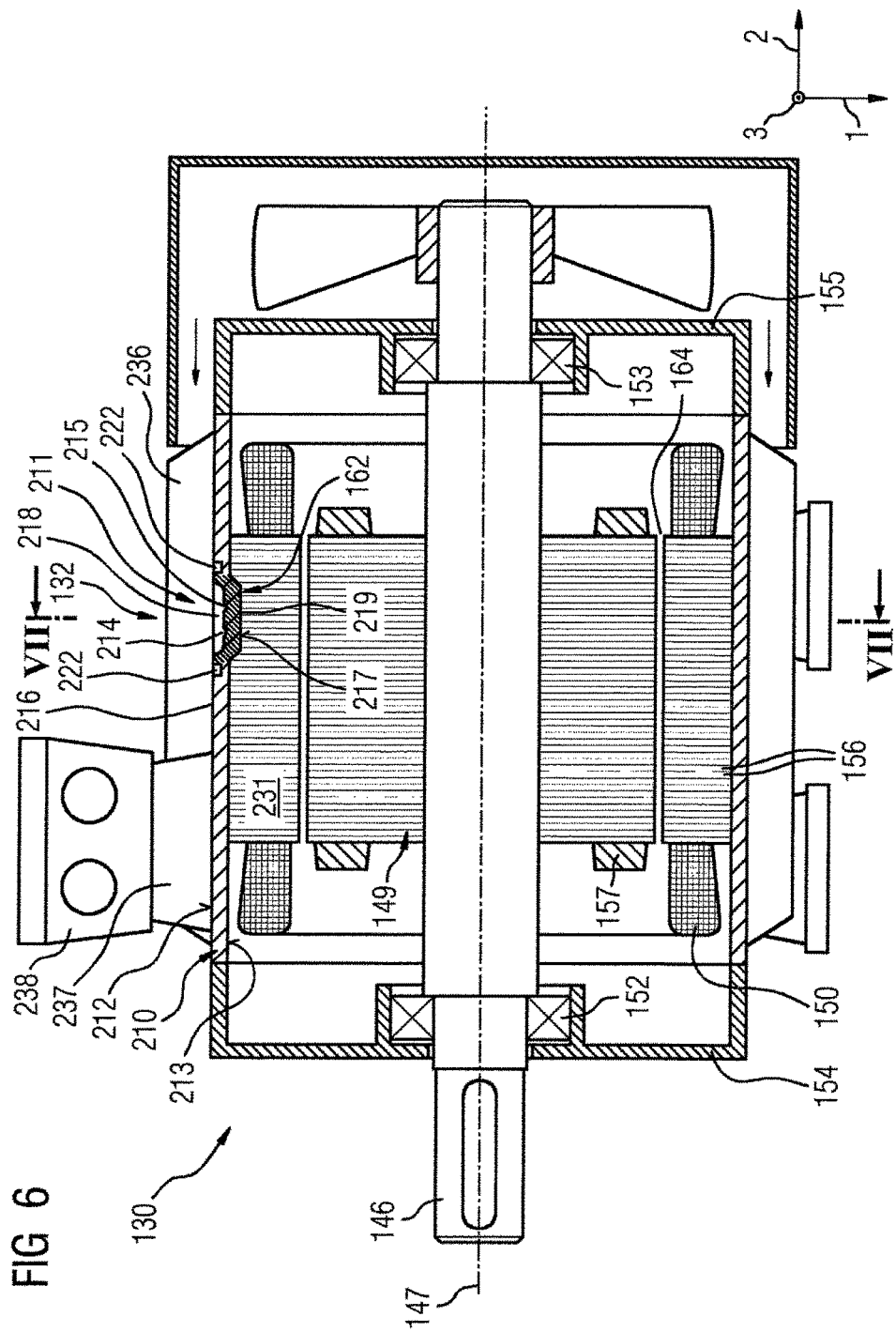

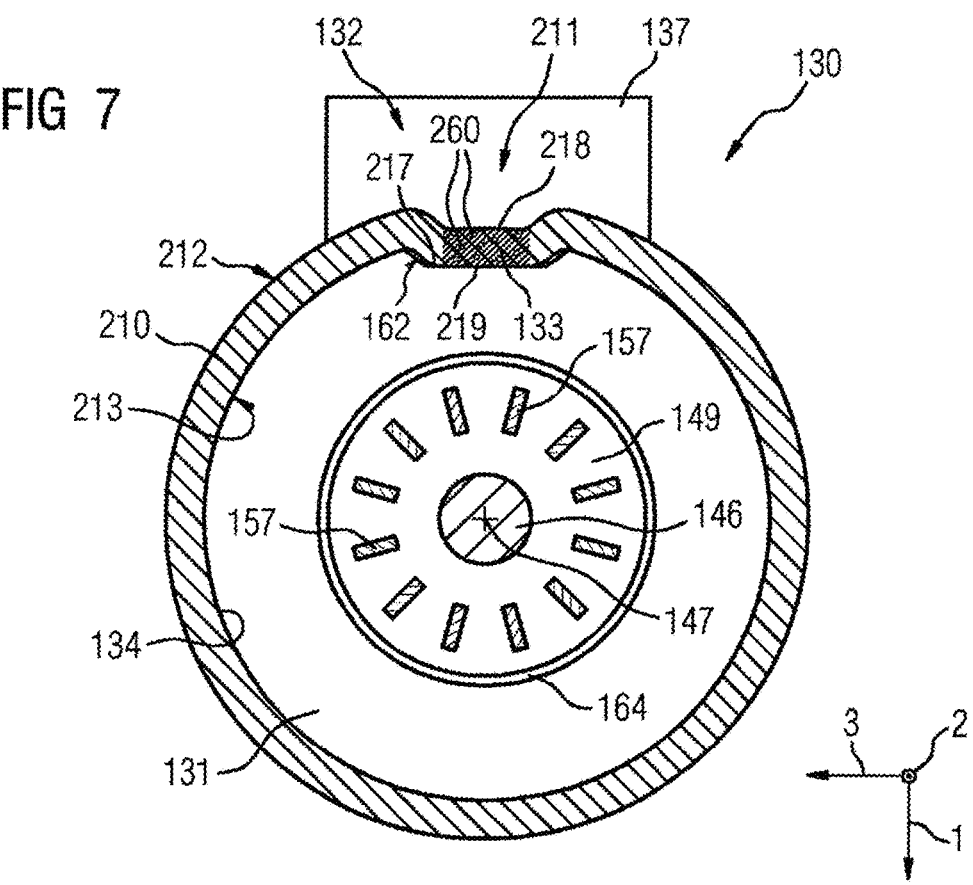

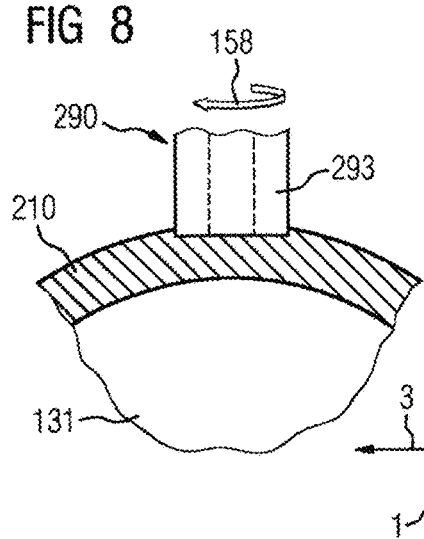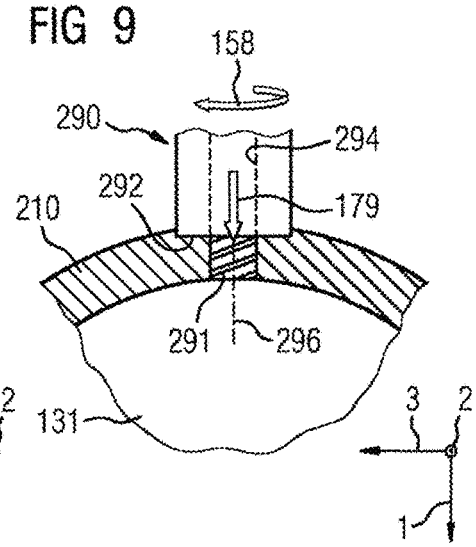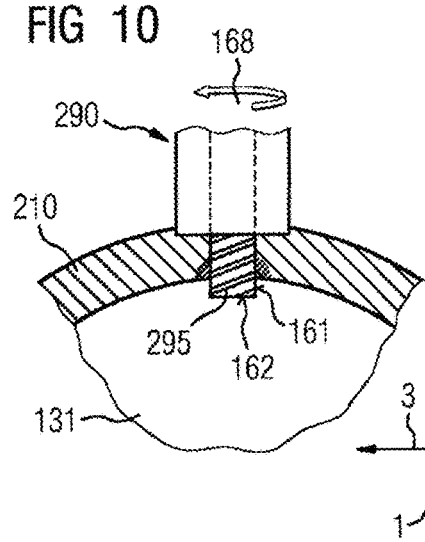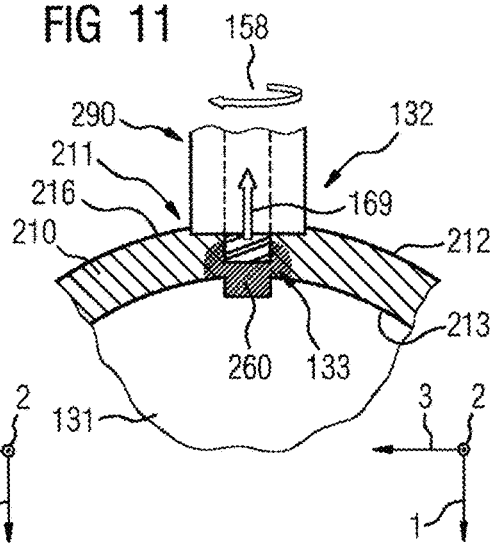

CAST PART WITH A METALLIC FUNCTIONAL REGION

CROSS-REFERENCES TO RELATED APPLICATIONS

This application is the U.S. National Stage of International Application No. PCT/EP2016/050159, filed Jan. 7, 2016, which designated the United States and has been published as International Publication No. WO 2016/131556 A1 and which claims the priority of European Patent Application, Serial No. 15155986.1, filed Feb. 20, 2015, pursuant to 35 U.S.C. 119(a)-(d).

BACKGROUND OF THE INVENTION

The invention relates to a cast part. The invention also relates to a piece of equipment which comprises the cast part, to a method for producing the piece of equipment, and to a use of a tool for shaping the functional region of the cast part.

Such a cast part is disclosed in U.S. Pat. No. 4,134,036 A. The cast part disclosed in said patent can be produced as a bell-like cast part of aluminum or other high strength lightweight material. In many cases, with regard to its function, the cast part must be further developed after casting for use in a piece of equipment, by means of subsequent precision working at some time after the casting. The further development of its function may consist in a metallic functional region, by virtue of the subsequent precision working, being able to retain a further component of the piece of equipment. For example, in the cited patent the piece of equipment is an electrical machine in which a rotor is caused to rotate during operation as a result of current being injected into windings of a stator. The forces occurring in this case result in counterforces in the stator which in this case, as a further component of the electrical machine, is retained in its housing, i.e. in the cast part. For this purpose, the patent makes provision for e.g. longitudinal ribs on the inner side of the cast part, circular grooves and openings for fastening the housing to the remainder of a tool. The longitudinal ribs with their projections and ribs are intended to secure the stator in the housing, and to prevent a relative rotation between the housing and the stator. The grooves can be used to prevent any relative axial movement between the stator and the housing. Taking as a starting point the various possibilities for connecting a stator to the housing, the cited patent also describes retention of the stator in the housing by means of an interference fit. The stator here is additionally secured against twisting by means of a screw connection which extends into the stator from the outer side of the housing. This further functional development of the housing also requires the subsequent addition of a hole by means of metal-cutting work to the housing, i.e. the cast part. The securing of the stator against twisting in the housing is often necessary in order reliably to ensure the transfer of force and torque, both in the production process for positional retention and during the service life of the product under the influence of forces, torques and high thermal loads.

The document JP 2010-178589 A is concerned with improving the efficiency of a rotating electrical machine. The efficiency is effectively improved by virtue of an identical tensile stress acting on the laminated stator core. The internal diameter of the housing of the rotating electrical machine and the external diameter of the laminated stator core have the same value, and therefore the laminated stator core can be inserted into the housing. The laminated stator core has grooves in the axial direction along the surface of the laminated stator core. A rotating tool is used to rub on the housing, such that the material of the housing can flow into the grooves of the stator in plasticized form. The stator is thereby fastened to the housing at two or more points via its surface. If an aluminum alloy is used as a material for the housing, the rotating tool preferably has a rotary speed of 800 r/min and is preferably moved at a speed of 200 mm/min in an axial direction along the housing. The housing is made of a nonmagnetic material such as the aluminum alloy or can be made of an austenitic SUS material. The abbreviation. SUS signifies stainless steel in accordance with the Japanese industry standard JIS.

In the case of an austenitic structural constituent, the elongation at rupture $A_5$ is approximately 40% to 50%. These values are defined e.g. in Wikipedia at the following link http://de.wikipedia.org/wiki/Austenit_(Gef%C3%BCgebestandteil).

The elongation at rupture is determined in a tensile test. The tensile test is a standard method of material testing for the purpose of determining the yield point, the tensile strength, the elongation at rupture and further material characteristic values. The tensile test is described e.g. at http://en.wikipedia.org/wiki/Tensile_testing. The elongation at rupture is determined on the basis of standardized test specimens.

In the case of rod-shaped test specimens having a circular cross section, the index 5 or 10 is generally used to define the elongation at rupture. This relates to the ratio k of a starting measured length $L_0$ and a starting diameter $d_0$ of the circular cross section. The elongation at rupture $A_5$ is therefore determined in the case of a tensile test using a test specimen where k=5.

In the case of iron and steel sheet, the elongation at rupture is usually determined using a flat test specimen having a starting measured length $L_0$ of 80 mm, and is defined as elongation at rupture $A_{80mm}$ or often simply as elongation at rupture $A_{80}$.

In the case of non-ferrous metals, the elongation at rupture is usually determined using a flat test specimen having a starting measured length $L_0$ of 50 mm, and is defined as elongation at rupture $A_{50mm}$ or often simply as elongation at rupture $A_{50}$.

The elongation at rupture is normally determined at room temperature, e.g. 23° C.

The producers of cast materials or cast parts produced using these materials specify a minimum elongation at rupture for the material to be cast or the cast part, defining an elongation at rupture A which usually corresponds to the value $A_5$, $A_{10}$, $A_{50mm}$ or $A_{80mm}$.

The document JP 2010-178598 A is concerned with improving the thermal conductivity between a laminated stator core and a metal housing, without the magnetic properties of the laminations degrading more in a combined part when the laminated stator core and the metal housing are connected. In order to achieve this, the laminated core is inserted into the cylindrical metal housing and the combined part is formed by means of friction stir welding of the laminated stator core and the metal housing. Since the connection is created by the kneading of the material during the friction stir welding and the plastic flow, melting of the magnetic laminations is not necessary. Since no great thermal stresses occur in the connection, the magnetic properties of the magnetic laminations are not significantly degraded. As a result of the material connection between metal housing and laminated stator core, the thermal conductivity is improved in comparison with a purely mechanical contact between metal housing and laminated stator core, and therefore the cooling of the dynamo-electrical machine is also improved. If the metal housing is produced from an alloy containing aluminum, the tool for the friction stir welding has a rotary speed of 800 r/min and is moved at a speed of 200 mm/min along the metallic housing. The tool is made of SKD61 (tool steel as per JIS, e.g. http://www.steel-grades.com/Steel-grades/Tool-steel-Hard-alloy/skd61.html), and comprises a cylindrical main part having a diameter of 20 mm and a cylindrical part having a diameter of 5 mm which projects 5 mm from the end thereof. The thickness of the housing is 6 mm. The penetration depth of the tool during the friction stir welding is 5.5 mm, wherein the housing has a thickness of 6 mm.

SUMMARY OF THE INVENTION

The object of the invention is to provide a technical contribution in relation to a cast part, such that a further function of the cast part can be provided economically and in high quality for a piece of equipment.

According to one aspect of the invention the object is achieved by a cast part which comprises a metallic functional region,
  wherein the functional region extends in a first direction from a first side to a second side of the cast part,
  wherein the cast part has a surrounding region which at least partially surrounds the functional region, and
  wherein the functional region is shaped by a friction-based process.

According to another aspect of the invention the object is also achieved by a piece of equipment having a cast part as set forth above.

According to another aspect of the invention the object is also achieved by a method for producing a piece of equipment. In the context of a method according to the invention for producing a piece of equipment according to the invention, the metallic functional region of the cast part is shaped by the friction-based process.

According to another aspect of the invention the object is also achieved by a use of a tool. In the context of an inventive use of a tool for shaping a metallic functional region of a cast part according to the invention, the functional region is shaped by a friction-based process.

The object is advantageously achieved according to the invention in that the shaping of the cast part by means of the friction-based process advantageously further develops the cast part with regard to its function as an element of a piece of equipment, in particular a machine. In an advantageously economical embodiment, the friction-based process is a friction-based process for plasticizing the cast part at a location of the functional region that is to be shaped. In an advantageously economical embodiment, the functional region can be shaped in high quality by means of a friction-based process after the cast part has been manufactured. In an advantageously economical embodiment, the shaping of the cast part can be effected in high quality by working the functional region using a tool. The surrounding region and the functional region can advantageously be produced as an integral part by casting in a casting mold.

The functional region is provided to further develop the function of the cast part. The functional region can further develop the cast part in high quality and in an advantageously economical manner to provide an additional function, by the introduction of undercuts, threads and positive or material connections to directly adjacent components, in particular components made of another material.

The functional region on the second side can be shaped using a tool by working from the first side, wherein the working from the first side comprises a friction-based process. It is thereby possible in an advantageously economical manner to achieve a further development of the function in high quality. Working from the first side can be particularly advantageous if the further development of the function of the cast part is required in relatively inaccessible points. The relatively inaccessible point is the second point here.

The functional region can be locally delimited. In an advantageously economical embodiment, the locally delimited functional region can be shaped by the friction-based process. Given that the locally delimited functional region only extends locally on the cast part, the effort involved in shaping the functional region is advantageously modest.

A piece of equipment according to the invention has the further advantage that it can be produced in high quality and in an advantageously economical manner. It is advantageously possible inter alia to prevent the piece of equipment or a workstation for producing said piece of equipment from becoming contaminated. In the case of swarf, such as occurs e.g. during metal-cutting work to the housing in order to further develop the function of the cast part with an additional function, the workstation is contaminated by this swan and/or the swan finds its way into the piece of equipment. In the case of a piece of equipment according to the invention, a further component of the piece of equipment can be retained by means of the functional region. During the production of the functional region for retaining the further component, it is advantageously possible inter alia to prevent contamination of the workstation used to produce the functional region and/or contamination of the piece of equipment.

An inventive method for producing a piece of equipment according to the invention has the further advantage that the cast part can be produced with basic functions in high quality and in an advantageously economical manner, and the functional region can be shaped by the friction-based process after a time interval in order to allow the further function to be provided in high quality and in an advantageously economical manner in addition to the basic functions of the cast part. Inter alia, the cast parts can be produced in advantageously large volumes and used for various equipment types, since the further function is advantageously produced by the shaping of the functional region using the friction-based process.

An inventive use of a tool for shaping a functional region of a cast part according to the invention has the further advantage that the metallic functional region can be shaped in an advantageously economical manner and in high quality using a single tool for the purpose of further developing the function of the cast part.

Advantageous embodiments of the invention are specified in the dependent claims. A technical contribution to the advantageous embodiment of an inventive cast part is advantageously made in this context, in order that a further function of the cast part can be provided economically and in high quality for a piece of equipment.

In an advantageous embodiment of a cast part according to the invention, the first side has circular friction marks as a result of the friction-based process. The functional region can advantageously be shaped by a rotating tool, for example. In a method according to the invention, for the purpose of shaping the functional region by means of the friction-based process, the rotating tool is brought into contact with the cast part, in particular by pressing the tool onto a surface at a location of the functional region that is to be shaped. As a result of rubbing and pressing the tool onto the surface as part of this activity, heat is generated locally which plasticizes a material of the cast part at a location of the functional region that is to be shaped, and therefore allows or aids shaping of the functional region. The rotating tool can advantageously be a tool for a known friction-based process, e.g. a tool for friction stir welding.

In a further advantageous embodiment of a cast part according to the invention, the surrounding region consists of a material having low ductility, this being specified for the material by an elongation at rupture A, for which a value that is less than 20%, in particular less than 10%, is defined. The actual elongation at rupture may have higher values at different points of the cast material. Cast parts can be produced with a low ductility, i.e. guaranteeing a low specified minimum elongation at rupture A, economically in large volumes with advantageously high accuracy and with local variants of the cast part. The advantageous shaping of the functional region by means of a friction-based process advantageously increases the field of application of the cast parts having low ductility and/or their use in pieces of equipment in large volumes, since cost-intensive metal-cutting work to the cast parts is advantageously avoided. In order advantageously to avoid heat dissipation during the shaping of the functional region, the surrounding region can have a dissipation-inhibiting device.

In a further advantageous embodiment of a cast part according to the invention, the cast part is produced in a diecasting process. For this purpose, materials are preferred which have at least one of the elements iron, manganese, chromium or cobalt, in order advantageously to avoid an adhesive tendency. Materials, in particular metallic diecasting materials, having at least one of said elements in advantageous concentration can only be specified with a maximum elongation at rupture A of 5%. Cast parts can therefore be produced from materials which are suitable for the diecasting process, because better releasability of the cast part from the casting mold after diecasting is advantageously achieved in a diecasting process.

In a further advantageous embodiment of a cast part according to the invention, at a second point close to the second side, the functional region has a foreign material in a higher concentration than at a first point close to the first side. This advantageously allows a material connection of the functional region to an adjacent component on the second side. In a method according to the invention, in order to achieve this, the tool for shaping the functional region can penetrate slightly into the further component, in particular by a few tenths of a millimeter. It is thereby possible to avoid expensive preparation of the further component for the material connection. In this case, the material connection can advantageously be created by diffusion over boundary surfaces of the functional region at the second side of the cast part and the adjacent further component. The foreign material in this case is the original material of the further component, which material mixes with the original material of the cast part, and therefore the concentration is the percental physical proportion of the foreign material in part-regions in the vicinity of the first or second point respectively.

In a further advantageous embodiment of a cast part according to the invention, the second side is shaped by a shaped structure that is surrounded by the surrounding region, wherein relative to the surrounding region the shaped structure forms a depression on the first side and an elevation on the second side. In this way, the function of the cast part as an element of a piece of equipment can advantageously be further developed by the shaped structure.

In a further advantageous embodiment of a cast part according to the invention, the shaped structure comprises machined material. Therefore a tool can advantageously be used to create a space for the shaped structure in a further component which is adjacent to the functional region on the second side of the cast part, and the shaped structure can then be shaped by means of the tool. As part of this activity, the tool is advantageously brought into contact with the cast part, the space and the shaped structure are created and the tool is then finally removed from the cast part. In this way, the machined material is produced by a metal-cutting part of the tool during the creation of the space. By virtue of the machined material of the adjacent component remaining in the plasticized original material at the functional region, a type of mixed structure or dispersion hardening is produced. The shaped structure can therefore advantageously withstand significant forces acting thereupon.

In a further advantageous embodiment of a cast part according to the invention, the shaped functional region extends linearly in a second direction. In this way, the functional region can advantageously be adapted in length in the second dimension to the dimensions of a piece of equipment according to the invention and if applicable to the associated forces. It is advantageously unnecessary in this context to adapt the shaping of the functional region by the friction-based process in the first direction and in a third direction. The first and the third direction span a cross-sectional plane from which the second direction extends. During the shaping of the functional region, a tool can advance at least sectionally in the second direction in a method step for the shaping of the functional region.

In a further advantageous embodiment of a cast part according to the invention, the shaped functional region is present as a point. Therefore the shaped functional region in a piece of equipment according to the invention can advantageously be present in a concealed region. During the shaping of the functional region, a tool can advance in the first direction in a method step for the shaping of the functional region.

In an advantageous embodiment of a piece of equipment according to the invention, the piece of equipment according to the invention is a machine which comprises a further component and a device for securing the further component against twisting, wherein the device comprises a connection between the functional region of the cast part and the further component. A workstation for producing the device for securing the further component against twisting can advantageously be combined with other manufacturing steps for producing the piece of equipment. Therefore a manufacturing step for positioning the further component in the piece of equipment can be combined with the shaping of the functional region by a friction-based process. This is possible at least because the shaping of the functional region advantageously avoids any contamination of the workstation. If the functional region was shaped by means of metal-cutting work, the workstation for producing the subsequent piece of equipment would be contaminated, thus hampering the positioning of the further component in the piece of equipment. In particular, in the case of an electrical machine, swarf can cause short circuits which can not only destroy the electrical machine but also represent a source of danger for the environment of the electrical machine. In particular, it is thereby possible in high quality and in an advantageously economical manner to provide an inventive machine which is an electrical machine. The connection between the functional region of the cast part and the further component for securing against twisting can be a material connection or a positive connection. Therefore the device for securing against twisting advantageously requires no further elements.

The further component can have a circular envelope curve, wherein the cast part surrounds the further component adjacent to the envelope curve and wherein the cast part and the further component form an interference fit at the envelope curve. Therefore the interference fit can advantageously be produced by warming the cast part, and the residual heat can then be used advantageously for the shaping of the functional region. Therefore the manufacturing step for the interference fit and the manufacturing step for shaping the functional region can also be advantageously combined.

The functional region can be locally delimited. The locally delimited functional region can advantageously be used to secure the further component, since the interference fit secures the further component against twisting in most operating states during operation of a piece of equipment, and the device for securing the further component against twisting only has to accommodate forces and torques in the event of greater forces or if an interference fit is lessened due to an increased temperature of the piece of equipment. As a result of the local delimitation, the time and effort required to shape the functional region can advantageously be reduced. In order to achieve this, the local functional region can extend over e.g. at most 25% of a dimension of the further component in a second direction or all directions.

In a further advantageous embodiment of a piece of equipment according to the invention, the device secures the further component asymmetrically against twisting. Advantageously therefore, the functional region and further functional regions need not be arranged symmetrically relative to each other in a cross-sectional plane of the piece of equipment. Therefore the time and effort required to shape the functional region can advantageously be reduced.

In a further advantageous embodiment of an inventive method for producing a piece of equipment according to the invention, the friction-based process comprises a method step in which a rotating tool having a high rotary speed, in particular a rotary speed greater than 3000 r/min, and a low rate of advance, in particular a maximum rate of advance of 50 mm/min, rubs against the cast part. In this way, with regard to its function, a cast part comprising a material of low ductility can advantageously be further developed as an element of a piece of equipment according to the invention, in particular a machine.

Advantageous embodiments of cast parts and pieces of equipment according to the invention, as well as methods and uses according to the invention, are derived by combining some or many different features.

BRIEF DESCRIPTION OF THE DRAWING

The properties, features and advantages of the invention as described above, and the manner in which these are achieved, become clearer and easier to understand in the context of the following description of the exemplary embodiments, these being explained in greater detail below with reference to the figures, in which:

FIG. 1 shows a view of a first side of a first exemplary embodiment of a cast part, FIG. 2 shows a view of a second side of the first exemplary embodiment of the cast part, FIG. 3 shows a first exemplary embodiment of a piece of equipment comprising a second exemplary embodiment of a cast part, FIG. 4 shows a cross section along the line IV-IV through the first exemplary embodiment of the piece of equipment as per FIG. 3, FIG. 5 shows a snapshot of a second exemplary embodiment of a method for producing the piece of equipment as per FIG. 3 and FIG. 4, FIG. 6 shows a second exemplary embodiment of a piece of equipment comprising a third exemplary embodiment of a cast part, FIG. 7 shows a cross section along the line VII-VII through the second exemplary embodiment of the piece of equipment as per FIG. 6, FIGS. 8-11 show snapshots of an exemplary embodiment of a method for producing the piece of equipment as per FIG. 6 and FIG. 7, and FIGS. 12-15 show exemplary embodiments of tools for shaping a functional region by means of a friction-based process.

DETAILED DESCRIPTION OF PREFERRED EMBODIMENT

Figure 12:
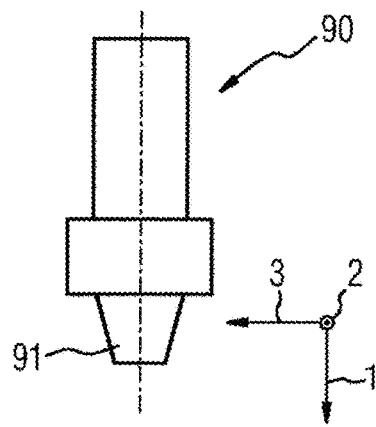

FIG. 1 shows a view of a first side 12 of a first exemplary embodiment of a cast part 10 which comprises a metallic functional region 11, wherein the functional region 11 extends in a first direction 1 from the first side 12 to a second side 13 of the cast part.

FIG. 2 shows a view of the second side 13 of the first exemplary embodiment of the cast part 10. The cast part 10 has a surrounding region 16, which surrounds the functional region 11. The functional region 11 is shaped by a friction-based process. The friction-based process leaves friction marks 14 on the cast part 10, said marks being circular due to the rotation of the tool relative to the cast part 10 when a rotating tool is used. In an exemplary embodiment of a method for producing the cast part 10 or one of the pieces of equipment as per FIGS. 3 to 11, the metallic functional region 11 of the cast part 10 is shaped by means of the friction-based process by working the functional region 11 using the rotating tool. The rotating tool is brought into contact with the cast part 10 for the purpose of shaping the functional region 11 by means of the friction-based process. During this activity, heat is generated locally as a result of the tool rubbing on the surface of the first side 12, wherein said rubbing plasticizes a material of the cast part 10 at a location of the functional region 11 to be shaped and thus allows or aids shaping of the functional region 11. After the rotating tool has shaped the cast part 10 to the desired degree, the rotating tool is removed from the cast part 10. As a result, the cast part 10 can exhibit an impression 20 of the tool, possibly in outline only. In the exemplary embodiment according to FIG. 1, a tool was applied of the type normally used for friction stir welding. In relation to the circular outer part 22 of the impression 20 in this case, an inner part 21 of the impression 20 forms a circular depression which is situated concentrically relative thereto. The outer part 22 of the impression is produced by a shoulder of the tool in this case, and the inner part of the impression 21 is produced by a pin of the tool. The surrounding region 16 consists of a material having low ductility, this being specified for the material by an elongation at rupture A for which a value of less than 20%, in particular less than 10%, is defined. In the exemplary embodiment according to FIG. 1, the surrounding region 16 and the functional region 11 are produced as an integral part from the material EN AC-AlSi9Cu3(Fe) by casting in a casting mold. This material has low ductility. This is specified for the material by an elongation at rupture A for which a value "<1" is defined. Said material is one of the aluminum alloys specified by the standard EN 1706; the elongation at rupture as a value is defined as the elongation at rupture $A_{50mm}$ in this case. With regard to the material AlSi9Cu3(Fe), a multiplicity of variants of this alloy are available and therefore the specified value for the elongation at rupture A can also be defined as a value between 1 and 3. The cast part 10 is produced in a diecasting process. The second side 13 is shaped by a shaped structure 17 which is surrounded by the surrounding region 16, wherein the shaped structure 17 forms a depression 18 relative to the surrounding region 16 on the first side 12 and forms an elevation 19 on the second side 13. The shaped functional region 11 extends linearly in a second direction 2 which is perpendicular to the first direction 1. For the purpose of shaping the functional region, the tool can therefore be brought into contact with the cast part 10 and then advanced over a larger section along the second direction 2, before the tool is removed from the cast part 10 and an impression 20 of the tool remains on the cast part 10. In the exemplary embodiment of a method for producing the cast part 10 or one of the pieces of equipment as per FIGS. 3 to 11 by means of a friction-based process, the friction-based process comprises a method step in which the rotating tool rubs on the cast part 10 at a rotary speed of 3200 r/min and the feed rate of 10 mm/min.

FIG. 3 shows a first exemplary embodiment of a piece of equipment 30 comprising a second exemplary embodiment of a cast part 110. The second exemplary embodiment of the cast part 110 has features that were described with reference to FIGS. 1 and 2. The features in FIGS. 3 to 5 are largely denoted by reference signs which are derived by prefixing the reference signs from FIGS. 1 and 2 with a "1". For example, the description of the metallic functional region 11 in FIG. 1 is transferred correspondingly to the metallic functional region 111 in FIGS. 3 to 5. Those features of the second exemplary embodiment of the cast part 110 which differ from the first exemplary embodiment of the cast part 10 are discussed in the following.

In the case of the piece of equipment 31, the functional region 111 is used to retain a further component 31 of the piece of equipment 30. In the exemplary embodiment of a method for producing the piece of equipment 30 or a piece of equipment as per FIGS. 3 to 11, the cast part 110 is provided with basic functions and the functional region 111 is shaped by the friction-based process in order to allow a further function of the cast part in addition to the basic functions of the cast part 110. In the exemplary embodiment of the piece of equipment 30 as per FIGS. 3 to 5, the piece of equipment 30 is a machine which comprises a further component 31 and a device 32 for securing said further component 31 against twisting, wherein the device comprises a connection 33 between the functional region 111 of the cast part 110 and the further component 31. The further component 31 has a circular envelope curve 34, wherein the cast part 110 surrounds the further component 31 adjacent to the envelope curve 34, and wherein the cast part 110 and the further component 31 form an interference fit at the envelope curve 34 (see FIG. 4). Therefore the cast part 110 is not only part of a housing of the piece of equipment 30, but also retains the further component 31 in the housing. With regard to the machine as per FIG. 3 and FIG. 4, for operation of the machine, the further component 31 is frictionally retained by virtue of the interference fit at a surface of the further component 31 and an inner surface of the cast part 110 on the second side 113. With regard to operation of the piece of equipment 30, i.e. the machine as per FIG. 3, a rotor 49 is caused to rotate about an axis of rotation 47 which extends along a second direction 2 and mechanical energy in the form of a rotational movement can be output to a mechanical load at a shaft 46 to which the rotor 49 is fastened. The forces and torques which occur in this case result in counterforces at the further component 31, which is retained in the cast part 110. During operation of the machine, mechanical energy can also be supplied to the machine via the shaft 46, again resulting in corresponding counterforces at the further component 31. In the case of the machine as per FIG. 3, the shaft 46 is mounted via a first bearing device 52 in a first end bracket 54 and via a second bearing device 53 in a second end bracket 55. The first and second bearing devices 52,53 each have rolling bearings. The first end bracket 54 and the second end bracket 55 define an extent of the housing of the piece of equipment 30 in the second direction 2. The first end bracket 54 and the second end bracket 55 are fastened to the ends of the cast part 110, the cast part 110 extending in the second direction 2 from the first end to the further end. In order to avoid heat dissipation during the shaping of the functional region 111, the surrounding region 116 can have a dissipation-inhibiting device 122. The dissipation-inhibiting device 122 has a groove which surrounds the metallic functional region 111 and thereby reduces the thickness of the cast part 110 and the associated cross section. By reducing the cross section, it is therefore advantageously possible to avoid heat dissipation during the shaping of the functional region 111.

In particular, the piece of equipment 30 is an electrical machine. Using the electrical machine, mechanical energy can be converted into electrical energy and vice versa by virtue of an electromagnetic interaction between the rotor 49 and a stator as further component 31. The electrical energy can be supplied to a winding 50, which is fastened to the further component 31, and converted into mechanical energy by virtue of the electromagnetic interaction between the further component 31 and the rotor 49. The further component 31 as stator 42 has a laminated core comprising laminations 56 which are stacked from a first end to a second end of the stator. The stacked laminations 56 serve to carry the magnetic flux during operation of the electrical machine. The rotor 49 has an entity which allows electromagnetic interaction with the stator, in particular with the winding 50 fastened to the stator, via the air gap 64. In the exemplary embodiment of the piece of equipment 30, said entity is a cage winding 57 and therefore the rotor 49 is a cage rotor. The cast part 110 has on its first side 112 cooling ribs 36 which are cast integrally with the cast part 110. The cooling ribs 136 encourage the heat dissipation during the shaping of the functional region 111, but are advantageous for cooling the electrical machine during operation. During operation of the electrical machine, a fan which is driven by the shaft 46 carries a stream of air along the cooling ribs 136 in order to carry away any waste heat of the electrical machine via cooling ribs 136. The cast part 110 also has an integrally cast part 137 of a terminal box 138. By means of the terminal box 138, the winding 50 and further windings of the stator can be connected to a three-phase alternating current source in order to allow electromagnetic interaction with the rotor 49. The electrical machine can therefore be operated as a three-phase asynchronous motor.

The cast part 110 consists of a material having low ductility. The material used for the cast part 110 is EN AC-AlSi11Cu2(Fe), for which the low ductility is specified with an elongation at rupture A of less than 1%. In particular, the value for $A_{50mm}$ is specified here for the elongation at rupture A. The cast part 110 is produced as an integral part with the cooling ribs 136 and the part 137 of the terminal box in a diecasting process.

FIG. 4 shows a cross section along the line IV-IV through the first exemplary embodiment of the piece of equipment 30 as per FIG. 3. In addition to a number of features described, the position of two points 141,142 is marked in FIG. 4. The functional region 111 has a foreign material in a higher concentration at a second point 141 near to the second side 113 than at a first point 142 near to the first side 112. The foreign material is the original material of the further component 31 in this case. In the exemplary embodiment as per FIG. 4, the further component 31 as stator of an electrical machine has the stacked laminations 56 comprising iron-silicon alloys. As described below in connection with FIG. 5, the functional region 111 has parts of the laminations 56, e.g. of the aluminum-silicon alloy, as foreign material at the second point 141 in the higher concentration.

FIG. 5 shows a snapshot of an exemplary embodiment of a method for producing the piece of equipment 30 as per FIGS. 3 and 4.

In addition to the previously described exemplary embodiment of a method for producing one of the pieces of equipment as per FIGS. 3 to 11, in an exemplary embodiment of a method for producing the piece of equipment 30 as per FIG. 5 the tool 90 penetrates slightly, in particular a few tenths of a millimeter, into the further component 31 during the shaping of the functional region 111. The cast part 110 was plasticized locally beforehand at the location of the functional region 111, initially using a pin 91 of the tool 90 placed on the cast part 110 and, after further penetration of the tool 90 in the first direction 1 of the cast part 110, using a shoulder 92 of the tool 90. As part of this activity, the tool 90 rotates in a direction of rotation 58 about its longitudinal axis. After the penetration of the tool 90 into the further component 31, the tool 90 is withdrawn from the cast part 110 in a direction 59 which is parallel to the first direction 1. The snapshot as per FIG. 5 shows this method step. As a result of the penetration of the rotating tool 90 into the cast part 110 and the further component 31, the foreign material from the component 31 is mixed with the material of the cast part 110 in a region 43, wherein the material connection 33 forms in said region 43. As a result of the rotation of the tool 90, the foreign material from the further component 31 is drawn into the cast part 110 and intermixed with the material of the cast part 110 to a greater extent at the edges 44 of the region 43 than in a region between the edges 44.

FIG. 6 shows a second exemplary embodiment of a piece of equipment 130, comprising a third exemplary embodiment of a cast part 210. This exemplary embodiment has features that were described with reference to FIGS. 1 to 4. The features in FIG. 6 are largely denoted by reference signs which are derived by prefixing the reference signs from FIGS. 3 to 4 with a "1" for the piece of equipment 130 or by prefixing reference signs from FIGS. 1 and 2 with a "2" in the case of the cast part 210. Those features of the piece of equipment 130 and the cast part 210 which differ from the piece of equipment 30 and the cast part 110 as per FIG. 3 and from the cast part 10 as per FIG. 1 are discussed in the following.

The second side 213 of the cast part 210 is shaped by the shaped structure 217, wherein said shaped structure 217 comprises machined material 260. The machined material 260 is indicated in FIG. 7 by particles 260 in the cross section of the functional region 211. FIG. 7 shows a cross section along the line VI-VI through the second exemplary embodiment of the piece of equipment 130 as per FIG. 6. The shaped structure 217 with the machined material 260 extends into a recess 162 of the further component 131. The recess 162 is defined by a number of consecutively stacked laminations 156 of the further component 131. In the exemplary embodiment as per FIG. 7, the further component 131 in this case forms the stator of the electrical machine, i.e, of the piece of equipment 130.

FIGS. 8 to 11 show snapshots of an exemplary embodiment of a method for producing the piece of equipment 130 as per FIGS. 6 and 7, for which method the following method steps are discussed in addition to the previously described exemplary embodiment of a method for producing one of the pieces of equipment as per FIGS. 3 to 11. In the exemplary embodiment of the method as per FIGS. 8 to 11, use is made of a rotating tool 290 that like the tool 90 has a cylindrical main part 290 in which a cylindrical part as pin 291 can be withdrawn into the main part 293 in a direction 169 or extended from the main part 293 in a direction 179 concentrically relative to the main part 293 in a channel 294. The pin 291 has a cylindrical shape. A cutting device 295 is provided on the circumferential surface of the pin 291 and has a cutting edge for metal-cutting work. In a second direction of rotation 168 of the tool 290 about its longitudinal axis 296, metal-cutting work using the tool 290 is possible. In the opposite direction of rotation 158, metal-cutting work using the cutting device 295 is not possible. The cylindrical main part 293 has a larger diameter than the pin 291, wherein the main part 293 has a shoulder 292 adjacent to the pin 291.

As described for the exemplary embodiment of a method for producing a piece of equipment 10,110,210 as per FIGS. 3 to 11, the rotating tool 290 is brought into contact with the cast part 210 for the purpose of shaping the functional region 211 of the cast part 210 by means of the friction-based process. It can be seen from FIG. 8 that the pin 291 is withdrawn into the main part 293 here. The tool rotates in the direction 158 here. As a result, the material of the cast part 210 is plasticized locally at a location of the functional region 211 that is to be shaped. As shown by the diagram in FIG. 9, in a following step the pin 296 is extended and introduced into the plasticized material as far as a surface of the further component 131. The material of the cast part 210 continues to be plasticized by the shoulder 292 in this case. As shown in FIG. 10, the tool 290 changes the direction of rotation once it has reached the surface of the further component 131. While the shoulder 292 continues to plasticize the material of the cast part 210, the pin 291 penetrates into the further component 131 as a result of metal-cutting work in the second direction of rotation 168. A recess is thereby created in the further component 131, in particular in the laminations 156. As shown in FIG. 11, in a further method step, having reached an end position of the pin 291 in the first direction 1, i.e. when the recess is of sufficient size to allow a positive connection, the pin 291 is withdrawn by a defined amount. At the same time, under the influence of a compressive force brought about by the shoulder 291 in the first direction 1, the plasticized material of the cast part 210 and some of the swarf 260 that is present as a result of the metal-cutting work flows into the space of the recess 161 that has been created.

During the entire process, the shoulder 292 acts in the manner of a seal against the escape of the plasticized and machined material, thereby advantageously preventing inter alia any contamination of the piece of equipment 130, in particular the exemplary embodiment as an electrical machine, or contamination of a workstation for producing the piece of equipment 130. The piece of equipment 130 therefore comprises the device 132 for securing the further component 131 against twisting, wherein the device 132 comprises the connection 133 as a positive connection between the functional region 211 of the cast part 210 and the further component 131. By virtue of the machined material 260 remaining in the plasticized original material of the functional region 211, a type of mixed structure and/or dispersion hardening is produced. The positive connection 133 can therefore withstand considerable forces acting thereupon.

As a result of using the tool 290 with the extendable pin 291, after the cooling of the cast part 210 and in particular the functional region 211, a positive engagement is present between the housing of the piece of equipment 130 and the stator as further component 131, without requiring separate work and an additional component in order to produce the securing means against twisting of the stator relative to the housing. The method and the use of the tool 290 featuring the extendable pin 291 as described above can advantageously be applied to a universally configured installation on which the conventional process of securing via a screw connection or drilling holes and pinning is still possible. As a result of providing the recess 162 by means of the tool 290 featuring the extendable pin 291, it is advantageously possible to dispense with exact positioning of the further component 131 relative to the cast part 210. In the case of an exemplary embodiment of a piece of equipment having an installed further component 131 which, unlike the exemplary embodiment as per FIG. 6, already has a recess before the further component 131 is inserted into the cast part 210, a further method for producing this piece of equipment provides for a rotating tool 90,190 featuring a fixed pin 91,191 to be brought into contact with the cast part 210 and heat generated locally on the first side 112 of the cast part 210 as a result of rubbing of the tool 90,190, wherein said heat plasticizes a material of the cast part 210 at a location of the functional region to be shaped and thus allows or aids shaping of the functional region. The material of the cast part 210 is therefore locally plasticized and geometrically shaped in the same work stage, to produce a shaped structure which forms a depression on the first side 212 and an elevation on the second side 213 relative to a surrounding region 216. In this case, the plasticized material of the cast part 210 flows into a space of the recess in the further component, i.e. the stator, as a result of the pressure of the tool 90,190.

The exemplary embodiments of the pieces of equipment 30,130 have locally delimited functional regions 111,211. The functional regions 111,211 only extend over at most 25% of a dimension of the further component 31,131 in the second direction 2.

In the exemplary embodiments of the pieces of equipment 30,130, the devices 32,132 secure the further components 31,131 asymmetrically against twisting. The devices 32,132 are asymmetrically arranged in the cross-sectional plane that is spanned by the first direction 1 and the third direction 3 in FIGS. 4 and 7, since only one device 32,132 is provided per piece of equipment 30,130.

In a further exemplary embodiment of a piece of equipment, the shaped functional region does not extend linearly in a second direction as per the pieces of equipment 30,31 according to FIGS. 3 and 6, but exists as a point within the part 137,237 of the terminal box 138. The shaped functional region is therefore present in a concealed region.

Figure 13:
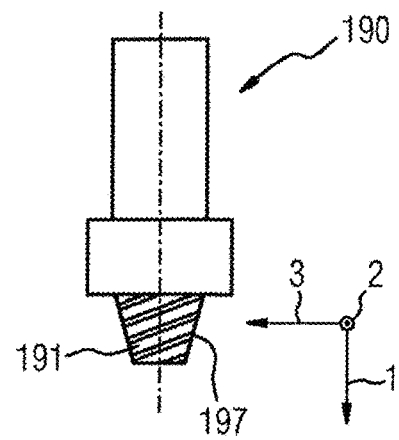
Figure 14:
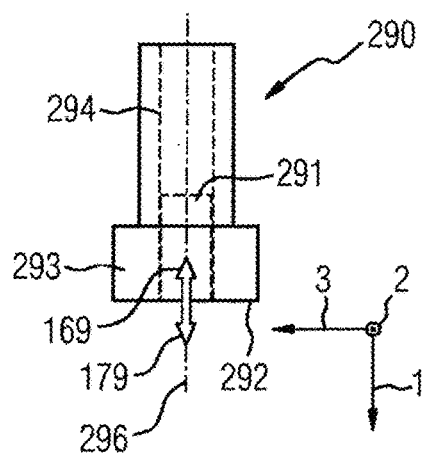
Figure 15:
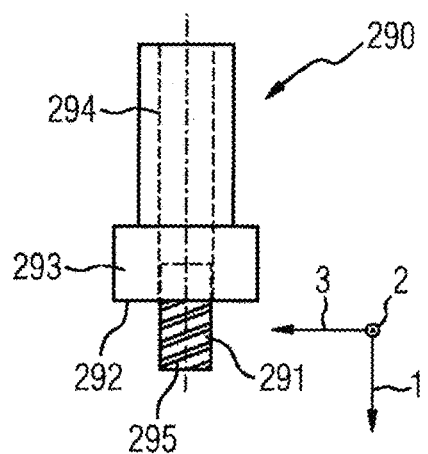

FIGS. 12 to 15 show exemplary embodiments of tools 90,190,290 for shaping a functional region 11,111,211 by means of a friction-based process. The tools 90,290 are described above with reference to FIGS. 1 to 11. The tool 190 has a has a fixed pin 191 which, in comparison with the previously described tool 90 having the fixed pin 91, has a contour 197 that is optimized for the friction-based process for shaping the functional region 11,111,211.

Although the invention is described in detail above with reference to the preferred exemplary embodiments, it is not restricted to the examples disclosed herein. Other variations may be derived therefrom by a person skilled in the art without thereby departing from the scope of the invention.

What is claimed is:

1. A method for producing an electrical machine, comprising:
   bringing a rotating tool including a cylindrical main part into contact with a cast part as a pin, movably received in the main part and having a cutting edge, assumes a retracted position;
   rotating the tool in a first direction of rotation to locally plasticize a material of the cast part at a location of a metallic functional region to be shaped of the cast part by a friction-based process;
   extending and introducing the pin into the plasticized material far enough to reach a surface of the further component, while the material of the cast part continues to be plasticized by a shoulder of the main part adjacent to the pin;
   changing the direction of rotation of the tool after the tool has reached the surface of the further component;
   introducing the pin in a first direction into the further component to thereby form a recess in the further component through metal-cutting work via the cutting edge as the tool rotates in a second direction of rotation while the shoulder continues to plasticize the material of the cast part;
   withdrawing the pin by a defined amount after the pin has reached a final position, thereby establishing the functional region of the cast part; and
   concurrently flowing plasticized material of the cast part and swarf, produced by the metal-cutting work as the shoulder applies a compressive force in the first direction, into a space of the recess to thereby produce a mixed structure or dispersion hardening.

2. The method of claim 1, further comprising securing the further component against twisting by connecting the functional region of the cast part and the further component.

3. An electrical machine, comprising:
   a cast part including a metallic functional region extending in a first direction from a first side to a second side of the cast part, said cast part having a surrounding region which at least partially surrounds the functional region, said second side having a shaped structure which is surrounded by the surrounding region and which forms a depression on the first side and an elevation on the second side relative to the surrounding region;
   a further component; and
   a device for securing the further component against twisting, said device having a connection between the functional region of the cast part and the further component, said functional region being shaped via a friction-based process as set forth in claim 1.

* * * * *